United States Patent [19]
Kriebel et al.

[11] Patent Number: 6,026,839
[45] Date of Patent: Feb. 22, 2000

[54] PROCESS FOR THE TRANSPORT OF MOLTEN SULPHUR AND TRANSPORT APPARATUS THEREFOR

[75] Inventors: Manfred Kriebel, Michelstadt; Alois Hobler, Reichelsheim, both of Germany

[73] Assignee: DSD Gas-und Tankanlagenbau GmbH, Berlin, Germany

[21] Appl. No.: 09/074,764

[22] Filed: May 8, 1998

[30] Foreign Application Priority Data

May 10, 1997 [DE] Germany ............................ 197 19 772

[51] Int. Cl.[7] ................................................. F16K 49/00
[52] U.S. Cl. ............................................. 137/13; 137/340
[58] Field of Search ............................ 137/340, 13, 334

[56] References Cited

U.S. PATENT DOCUMENTS

| | | | |
|---|---|---|---|
| 3,269,401 | 8/1966 | Scott et al. ................................. | 137/13 |
| 3,670,752 | 6/1972 | Marsden, Jr. et al. ..................... | 137/13 |
| 3,678,243 | 7/1972 | Ando et al. ................................ | 137/13 |
| 3,846,279 | 11/1974 | Merrill, Jr. ................................. | 137/13 |
| 3,977,427 | 8/1976 | Reed et al. ................................. | 137/13 |
| 4,137,938 | 2/1979 | Logan ........................................ | 137/340 |
| 4,778,586 | 10/1988 | Bain et al. .................................. | 137/13 |

OTHER PUBLICATIONS

"Engineering Considerations for Long Distance Sulphur Lines", Pipe Line Industry, Sep. 1994, p. 39.

"World's Longest Sulphur Pipeline Operating Smoothly After 3 Years", Oil & Gas Journal, Jan. 20, 1997.

*Primary Examiner*—A. Michael Chambers
*Attorney, Agent, or Firm*—Fulbright & Jaworski, LLP

[57] ABSTRACT

An apparatus and process are provided for the transport of molten sulphur in pipelines having mantle heating by means of a liquid medium heated to a temperature above the melting point of sulphur, which reduce transport costs and technology and energy expenditures. Petroleum from an associated pipeline is used as the heating medium. The sulphur pipeline (10) is laid in the area of the petroleum pipeline (1). The pipeline has at least one in-line pump station (7, 8, 9) for the increase of the transport pressure of the petroleum, and the petroleum used as the heating medium is reheated and brought to a higher pressure in one of these pump stations. The molten sulphur (23) is again brought up to a sufficient transport pressure in the at least one pump station (7, 8, 9).

14 Claims, 4 Drawing Sheets

6,026,839

PROCESS FOR THE TRANSPORT OF MOLTEN SULPHUR AND TRANSPORT APPARATUS THEREFOR

FIELD OF THE INVENTION

The invention relates to a process for the transport of molten sulphur in pipelines with mantle heating by a liquid heating medium, said medium having been heated to a temperature above the melting point of sulphur.

DISCUSSION OF PRIOR ART

Sulphur has a melting point of 118° C., while viscosity of the melt increases significantly above about 160° C. Moreover, sulphur has a very high thermal expansion coefficient which can lead to bursting of the conduit in the event of freezing and remelting if the remelting occurs between two pipe sections which are still frozen.

Such a process is known from King's article "World's longest sulphur pipeline operating smoothly after three years," published in the "Petroleum & Gas Journal," January 1997, pgs. 59 to 65. Over a distance of 41 km circulating water is used as heating medium and must be kept at temperatures between 120° C. and 150° C. and pressures between 2 and 5 bar, overlooking for now the transport pressures over longer distances. The return conduit necessary to close the heating circuit adds correspondingly to the cost of the apparatus. The heating medium must be introduced at a high initial temperature so that the temperature does not drop below the melting point of sulphur due to energy loss over the long distance. There is no mention of a parallel petroleum pipeline.

However, water has the disadvantage that it acts corrosively, that it too freezes and bursts the conduit if the heating fails in cold areas, and in the event of pressure loss, evaporates suddenly at temperatures over 100° C. until the temperature drops to the boiling point.

The literature cited also discusses the possibility of electrical heating but concludes that it is even more disadvantageous because heating resistors have a limited lifetime and are difficult or practically impossible to replace.

Refining of crude oil and treatment of natural gas yields considerable amounts of sulphur. While it is common to transport petroleum in pipelines over distances in excess of 5,000 km, the extracted liquid sulphur is, except in the aforementioned case, transported by road vehicle, rail or water or simply stored at the refinery in solid form so that after solidification considerable amounts of energy are needed for remelting. Depending on the quality of the raw material, a petroleum or gas installation or refinery of the usual size produces 100 to 10,000 tons of sulphur daily which represents about 3% to 20% of the processed raw materials.

In petroleum pipelines it is common and necessary to arrange pump stations with so-called booster pumps, i.e. booster stations, every 70 to 100 km in order to restore the dropped pressure.

It is known from U.S. Pat. No. 4,137,938 to transport liquid sulphur through a conduit within which two heating conduits are arranged to carry the heating fluid in one direction and back. Petroleum, glycol or similar liquids are named as heating fluids which are removed from the heating conduit at intervals and returned to the heating conduits after reheating. However, locating the sulphur pipeline parallel to a petroleum pipeline is not mentioned so that the heating fluid cannot be drawn from such a petroleum pipeline. The possibility is also lost to draw petroleum from a non-existing petroleum pipeline for the purpose of heating by combustion of the petroleum. Even though it is indicated that heating or booster stations can be arranged along the sulphur pipeline in which stations the heating medium can be reheated, such booster stations are designed for the heat and power required for the transportation of sulphur. However, power requirements for the transport of much greater quantities of raw petroleum are many times higher so that in particular the possibility of exploiting the waste heat from large turbines in petroleum pipeline booster stations is absent, for example the exploitation of the very large energy potential of extremely hot exhaust from such large turbines.

Because the sulphur flows in the outer conduit and the heating medium in the inner conduit, another resulting problem is that of thermal insulation to prevent excessive heat loss. The cited document proposes to let the sulphur solidify at the outer wall of the conduit since sulphur is a very poor heat conductor. This results in three additional disadvantages. First, a large part of the conduit is lost due to the solidified sulphur. Second, sulphur does not solidify with a smooth surface but one that is irregular and broken, resulting in a high flow resistance. Third, heat balance and thickness of the solidified sulphur practically cannot be controlled, not to mention kept constant "Engineering considerations for long distance sulphur lines," an article published in "Pipe Line Industry," September 1984, pgs. 39–41, extensively reflects on the question which heating possibilities (inner or outer heating, liquid heating by hot water, steam heating, electric heating by resistance heat and inductive coupling) and which types of thermal insulation (polyurethane, mineral wool) are preferable. But primarily the article deals with evacuation and refilling of the sulphur conduit by a replacement medium such as a gel or semi-solid shot, a process called 'pigging.' The problem underlying the invention is not even once discussed in the article.

SUMMARY OF THE INVENTION

The objective of the invention is therefore to provide a process of the kind initially described, by which molten sulphur can be transported over similar distances as petroleum, at defensible cost and without the need for excessive expenditures in technology and energy.

According to the invention, the objective is achieved by the process initially described in that a) petroleum from a parallel pipeline is used as the heating medium, b) the sulphur pipeline is laid in the area of the petroleum pipeline route, with at least one in-line pumping station for increasing the transport pressure of the petroleum, c) the petroleum used as heating medium is reheated and brought to a higher pressure in the at least one pumping station, and d) the molten sulphur is returned to a sufficient transport pressure in the least one pumping station.

Petroleum is not at risk of freezing or even bursting or corroding the conduit or the heating mantle. It is available in any quantity and the right-of-way which is necessary anyway, or already present, can be used to lay the sulphur pipeline which saves considerable expense. In particular, the petroleum pumping stations and their equipment can also be used, after appropriate extension, to return the petroleum heating medium to the required temperatures and pressures.

Operation is possible using existing personnel. Energy expended for maintaining pressure and temperature represents only a few percent of the sulphur price and is quite affordable even if the fluctuating price of sulphur reaches its low point. But primarily, dependable transport even over great distances of several thousand kilometers is possible. The same ports can be used which are available for the docking of oil tankers, i.e. the sulphur accompanies the petroleum in parallel. A return transport of the petroleum heating medium is not necessary so that a second or third conduit can be saved.

In any case, all logistics and the technical installations of the petroleum pipeline can be put to use for the subject of the invention. The total quantity of the heating medium and of the petroleum corresponds to the total quantity of the crude oil to be transported so that the diameter of the petroleum pipeline can be reduced correspondingly. In this manner, its related costs are also reduced.

It is particularly advantageous here if, at a point where the petroleum and the sulphur are introduced into the pipeline, a portion of the petroleum to be transported is diverted, and after being heated as the heating medium, is introduced into the heating mantle, and if, at a destination point of the pipeline said portion is again added to the main volume of petroleum. The heating medium is thus merely "borrowed" and is available as petroleum after fulfilling its function.

The flow velocity of the heating medium need not be the same as the main petroleum stream; it can be varied within wide boundaries by a choice of the cross section of the annular gap between the heating mantle and the sulphur conduit.

It is particularly advantageous here if a portion of the petroleum is burned in order to heat the heating medium.

The process can be optimized further in terms of energy by at least partially heating the petroleum used as heating medium from the waste heat from the pump drive apparatus (e.g., gas turbines) used for the main petroleum volume and/or the molten sulphur and/or the heating medium. Commonly, gas turbines which produce very high exhaust temperatures, are used in such drive apparatus. Corresponding quantities of energy have been heretofore wasted when used exclusively for petroleum transport, with great environmental burden, including nitrous oxides.

It is further of advantage if the petroleum being used as heating medium, and its heat content, are again added to the main volume of petroleum in the at least one pump station and if a portion of the petroleum is again diverted and after additional heating is used as heating medium and introduced into the heating mantle.

In this way the petroleum is heated by small amounts, but these are sufficient to reduce the viscosity of the petroleum so that a reduction of the petroleum pump load is achieved.

The invention also concerns a transport apparatus for molten sulphur with a pipe conduit having a heating mantle for a liquid heating medium.

In order to achieve the same objective, such apparatus according to the invention is characterized in that a) the sulphur pipeline is laid in the vicinity of a petroleum pipeline with at least one interposed pump station for increasing the petroleum pipeline transport pressure, b) two successive sections of the heating mantle in the vicinity of at least one of the pump stations are connected in a series comprising a feed pump and a heat exchanger, c) two successive sections of the sulphur pipe conduit are connected through a feed pump in the at least one pump station.

It is of particular advantage here if at an intake location of the petroleum pipeline and the molten sulphur pipeline, a branch line is arranged for a portion of the transported petroleum, and if at a destination point of the pipeline the heating mantle flow is again connected with the petroleum line flow.

In the course of a further embodiment of the invention it is again of advantage if a) a regulating valve is arranged in a pump conduit with a feed pump for the petroleum pipeline, b) the heating mantle is connected to the intake side of the feed pump via a heating medium conduit of a preceding sulphur conduit section, c) the pump conduit of the petroleum pipeline is connected at the discharge side of the feed pump via a branch line and a heat exchanger to the heating mantle of a subsequent sulphur conduit section, and if d) a flow meter for the heating medium is arranged in the branch line by means of which the diverted volume can be regulated by a control valve in the petroleum pump conduit.

A particularly simple and inexpensive construction results if the sulphur pipe is mounted on the petroleum pipe. By skillful mechanical connection a load-bearing structure can be achieved in this case for the crossing of rivers and swamps above or below grade.

DESCRIPTION OF DRAWINGS

An example of the subject of the invention and partial variations are explained below by means of FIGS. 1 to 4. There are shown in FIG. 1 a first section of a transport installation over a distance of three pump stations, or about 200 km, partly in cross section, in FIG. 2, a detail of FIG. 1, right, with additions, in FIG. 3, a variant of the subject according to FIG. 2, and in FIG. 4, a distance diagram where the distance is shown on the x-axis and the pressure and temperature variations over said distance are shown on the y-axis, according to an exemplary embodiment of the invention indicated below.

DETAILED DESCRIPTION

Figure 1:
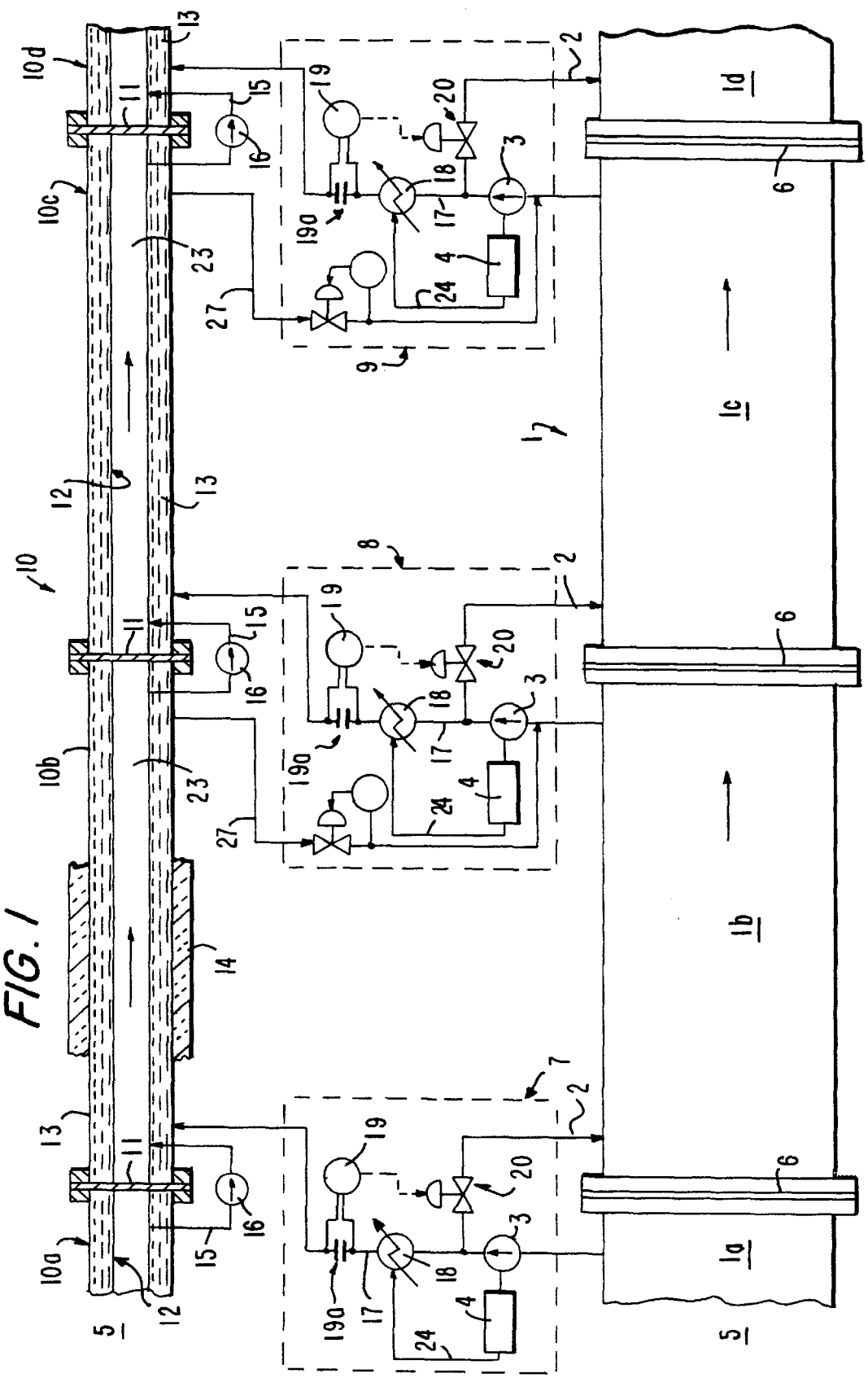

FIG. 1 shows a petroleum pipe conduit 1 comprising sections 1a, 1b, 1c and 1d which are axially separated but connected via pump conduits 2, in each of which one feed pump 3 is arranged, said pump being driven by a combustion engine 4 (e.g. a gas turbine). Section 1a is very short, immediately preceding it is the feeding point 5. Sections 1b, 1c and 1d are each between 50 and 100 km long, and the arrangement progresses to the right, effectively as far as may be desired. The diameter to length ratio is extremely exaggerated and not shown to scale.

In the area of the points of separation 6 are located in each case one pump station 7, 8 and 9 with which the pump conduits 2 and the combustion engines 4 are associated. So far this represents a classic arrangement of a petroleum transport installation.

Parallel thereto runs the sulphur transport pipe conduit 10 which comprises sections 10a, 10b, 10c and 10d. Separation points 11 of said sections are arranged with the same division as the separation points 6. The pipe conduit 10 comprises the inner pipe conduits 12 for the transport of sulphur and the heating mantles 13, arranged concentrically in relation to said inner pipe conduit and provided along their entire length with insulating jacket 14 of which only a short portion is shown.

Figure 2:
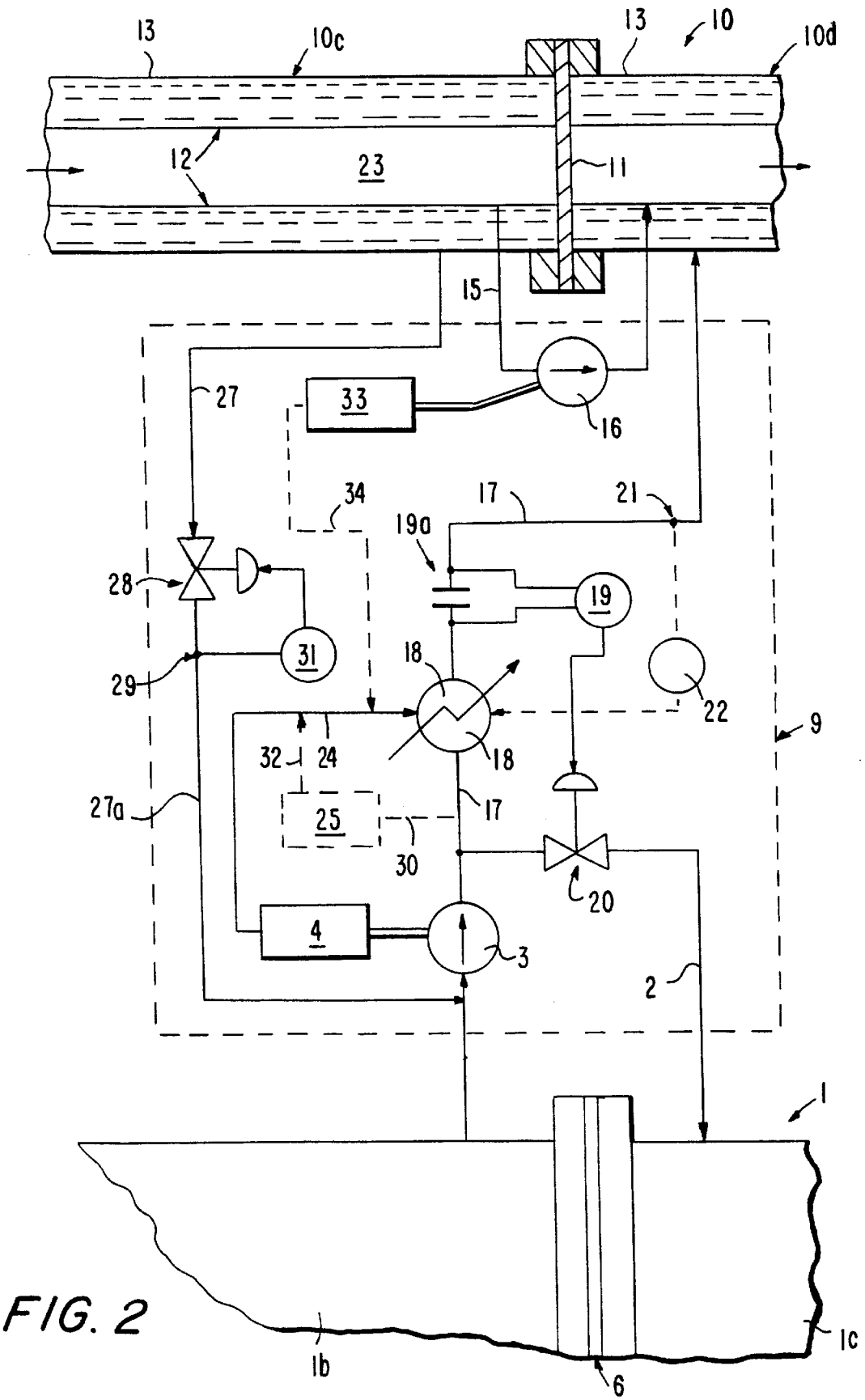

The inner pipes 12 of the individual sections 10*a* to 10*d* are connected in the vicinity of their points of separation 11 in each case by one feed pump 16. From one point of separation to the next the pressure drops in each instance from about 80 to about 12 bar and is returned to 80 bar by the feed pumps 16. At the beginning of each section the sulphur temperature is about 157° C.; it drops to about 125° C. at the next point of separation. Temperature is raised in the following manner:

From the discharge side of each petroleum feed pump 3 a branch line 17 extends in each case through a heat exchanger 18 to each beginning part of each heating mantle 13. The volume regulation takes place by means of a flow meter 19*a* and a regulator 19 which acts upon a regulator valve 20 which is also arranged in the pump conduit 2. The temperature regulation takes place by means of a temperature sensor 21 and a regulator 22 which acts on adjustment member (not shown) of the heat exchanger 18 (FIG. 2). This initially equalizes the energy balance in the flowing sulphur melt 23.

Figure 3:
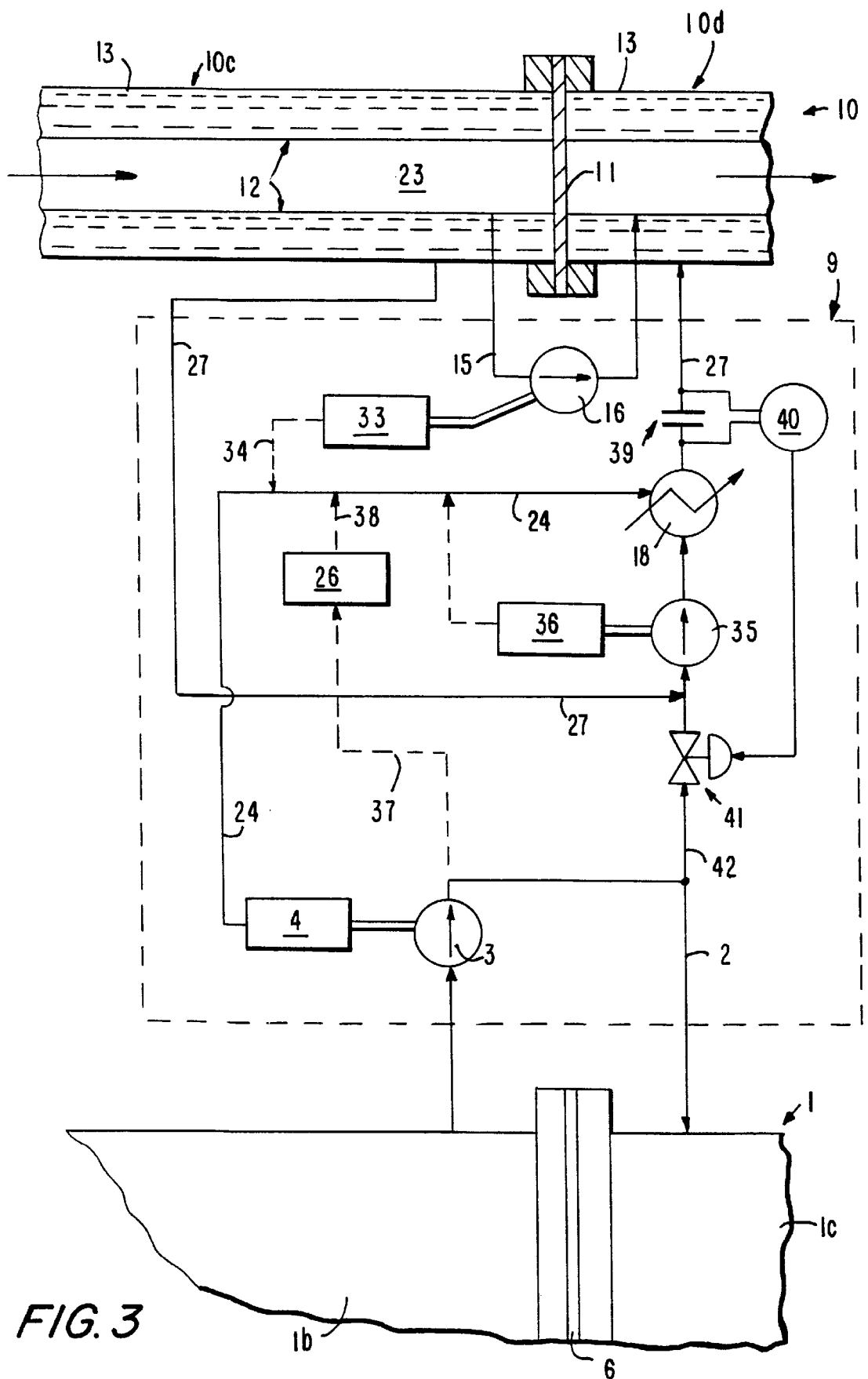

From the combustion engine 4 an exhaust line 24 extends to the primary side of each heat exchanger 18, which is not absolutely necessary but is especially economical. Alternative or supplemental possibilities with petroleum-heated combustion chambers 25 or 26 are shown in FIGS. 2 and 3.

Up to this point the equipment of the pump stations 7, 8 and 9 is identical. However, in pump stations 8 and 9 there is additionally taking place via return flow conduits 27 a return of the partially cooled heating medium from the heating mantle 13 to the inlet side of the feed pumps 3 which is explained in more detail by way of FIG. 2. On this side of each point of separation 6 in the petroleum pipeline 1 the pressure is about 10 to 12 bar which pressure is again raised to about 80 bar by means of the feed pumps 3. The pressure differential between the end of each heating mantle 13 and the inlet side of the feed pump 3 is therefore about 2 bar. FIG. 1 shows pipe conduits 15 and the feed pumps 16 outside of the pump stations 7, 8 and 9. But they can be preferably located within the pump stations 7, 8 and 9 as is shown in FIGS. 2 and 3 in which the previous reference numbers have been applied unchanged.

In FIG. 2 there are shown in the return flow conduit 27 a regulating valve 28 and a pressure sensor 29 which allow the pressure in the conduit section 27*a* before the feed pump 3 to be set by means of a regulator 31 to a predetermined pressure which is just above the pressure of the petroleum immediately before the separation point 6.

In addition, the following is shown: a small amount of petroleum can be drawn off from the petroleum and/or the heating medium at the discharge side of the feed pump 3 via a conduit 30, to be used as fuel and to be supplied to combustion chamber 25 from where a fuel gas line 32 runs through the exhaust line 24 to the primary side of the heat exchanger 18, in order to produce heat energy which may possibly be in deficit. If the exhaust heat of the combustion engine 4 is not used then the combustion chamber 25 alone takes over the heating of the heat exchanger 18.

Feed pump 16 is driven by a combustion engine 33 whose exhaust is also supplied to the primary side of the heat exchanger 18 via an exhaust line 34 and the exhaust line 24. However, this is also not absolutely necessary, but energetically advantageous.

In FIG. 3 the transport passages of the main stream of petroleum are separated from the heat medium so that a third feed pump 35 with a combustion engine drive is provided. Here, too, the possibility is provided to draw a small amount of petroleum from the main stream via a conduit 37, said petroleum to be used as fuel and to be supplied to the combustion chamber 26 from which a fuel gas line 38 extends through the exhaust line 24 to the heat exchanger 18. There is provided in the return line 27 a flow meter 39 (for example a metering orifice with a regulator 40. Said regulator is connected with a regulating valve 41 which is arranged in a branch line 42. Said branch line connects the pump line 2 on the discharge side of the feed pump 3, which is associated with the main petroleum stream, with the return line 27 so that any (small) leakages and/or temperature-dependent volume fluctuations of the heating medium can be equalized.

It is shown that exhaust from all combustion engines 4, 33 and 36 and the combustion gases of the combustion chamber 26 are fed to the primary side of the heat exchanger 18. However, it can be provided that the possibilities are alternative and/or additive.

The petroleum conduit and the sulphur conduit can be laid together along the same route underground, or, with appropriate insulation, above ground. The heat exchanger 18 can also be designed directly as a heater so that no separate combustion chamber need to be installed upstream.

Figure 4:
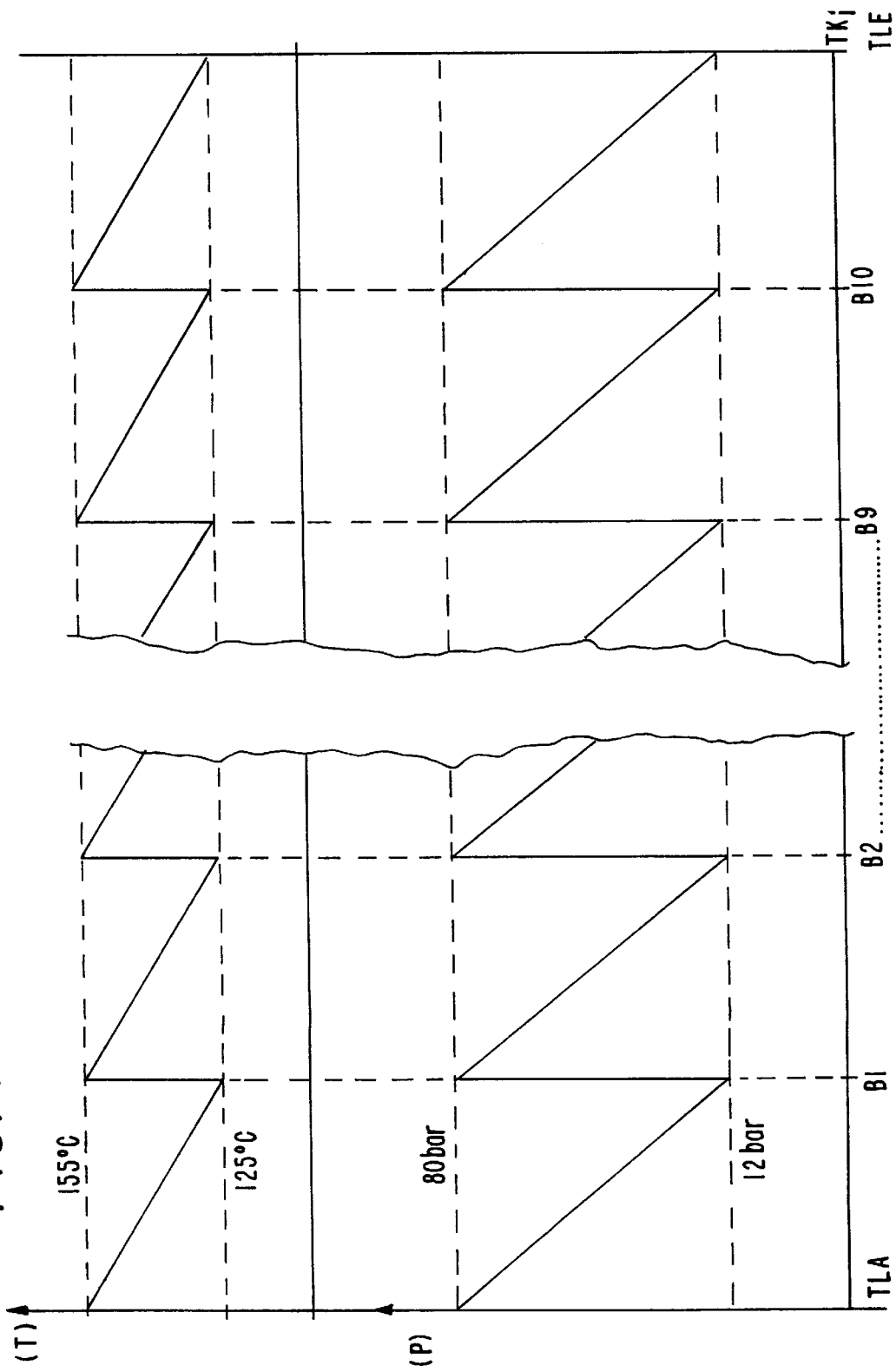

FIG. 4 shows a distance diagram where the distance is shown on the x-axis and the pressure and temperature variations over said distance are shown on the y-axis, according to an exemplary embodiment of the invention indicated below.

EXAMPLE

In a 1,000 km petroleum pipeline with an inside diameter of 750 mm, 30,000 tons of crude oil per day were transported at a flow velocity of 1.75 m/s. Parallel to this petroleum pipeline ran a sulphur conduit with mantle heating and an inside diameter of 200 mm, in which liquid sulphur was transported at a velocity of 0.7 m/s. This corresponds to a sulphur volume of 10,000 tons per day. In order to keep the sulphur liquid it had to be kept at a temperature of 155° C. after each heating and at 125° C. it the end of each conduit section before reheating. The entire 1,000 km distance was divided into ten sections of 100 km between which so-called booster station were placed for the reheating of the sulphur from 125° C. to 155° C. and for the necessary increase of pressure. Flow pressure at the beginning of each section was 80 bar and at the end of the section 12 bar. The necessary pressure increase was therefore 68 bar. Pressurization of the petroleum took place in the same booster stations. Temperature and pressure curves are shown in idealized form in FIG. 4, between a start terminal "TLA," over 10 booster stations B1, B2, ..., B9, B10 up to the terminal "TLE" or a tank "TK" which are arranged at distances indicated above.

Heat capacity of $1 \times 10^{-6}$ Kj/h per booster station was needed for the heating of the sulphur from 125° C. to 155° C. Heat energy was transferred to the sulphur from the crude oil which was diverted from the pipeline and heated from 135° C. to 165° C. in an oil-fired heat exchanger and fed into a heating mantle which surrounded the sulphur conduit concentrically. The required crude oil quantity for the reheating of the petroleum as heat medium was about 150 t/h, or 3,600 t/day. The quantity of the heating medium represented about 12% of the transported petroleum amount of 30,000 t/day and was drawn from the oil pipeline at the start of the entire transport distance, i.e "borrowed," and was again returned to the main stream of petroleum at the end of the pipeline, that is, at the terminal or oil tank. This volume of the heat medium for the heating of the sulphur line heating mantle was therefore merely transported via a second transport route and reduced the energy requirement for the transport of the petroleum in the petroleum pipeline. The annular gap for the heat medium, formed between the sulphur conduit and the heat mantle was 50 mm, i.e. the outside diameter of the coaxial conduit was 300 mm.

The energy requirement for the sulphur line was about 6 MW per booster station, of which about 1 MW was allocated to the pumps for increasing pressure and about 5 MW for heating the medium for the heating mantle. The power requirement for the transport of 1,000 tons of sulphur over a distance of 1,000 km with 10 booster stations amounts to about 60 MW.

What is claimed is:

1. A process for the transport of molten sulphur in a pipe conduit having a heating mantle using a liquid heating medium heated to a temperature above the melting point of sulphur, said process comprising:
    a) taking petroleum from a petroleum pipeline for use as heating medium;
    b) providing said petroleum pipeline with at least one pump station connected in-line so as to increase the petroleum transport pressure, the sulphur pipe conduit being laid in the vicinity of said petroleum pipeline;
    c) heating the petroleum being used as heating medium in one of the pump stations and bringing said petroleum to a higher pressure;
    d) bringing the molten sulphur to a sufficient transport pressure in the at least one pump station.

2. Process according to claim 1, wherein a portion of the transported petroleum is diverted at a feed point of the petroleum pipeline and the sulphur pipeline, and, after being heated, is fed as the heating medium into the heating mantle, and said portion of the petroleum is returned to the main volume of the petroleum at a final point of the route.

3. Process according to claim 2, wherein the petroleum which is used as the heating medium is at least partially heated by the exhaust of the pump drive apparatus used for the main volume of the petroleum and/or for the molten sulphur and/or for the heating medium.

4. Process according to claim 2 wherein in the least one pump station petroleum which is used as the heating medium and the heat content of said petroleum is again combined with the main volume of the petroleum, that a portion of the petroleum is again diverted, and after another reheating, is again used as the heating medium and fed into the heating mantle.

5. Process according to claim 2, wherein the pressure and/or volume of each diverted portion of the heating medium is regulated.

6. Process according to claim 1, wherein a portion of the petroleum is burned in order to heat the heating medium.

7. Process according to claim 1, wherein the temperature of the sulphur is kept between 120° C. and 160° C., preferably between 125° C. and 157° C., by the heating medium.

8. Transport apparatus for liquid sulphur having a pipe conduit with a heating mantle for a liquid heating medium, said apparatus comprising:
    a) the sulphur pipe conduit is laid in the vicinity of the route of said petroleum pipeline with at least one pump station connected in-line for increasing the petroleum transport pressure,
    b) two successive sections of the heating mantle in the vicinity of at least one of the pump stations are connected in a series comprising a feed pump and a heat exchanger, and
    c) two successive sections of the pipe conduit for the sulphur in the at least one pump station are connected via a feed pump for the sulphur.

9. Transport apparatus according to claim 8, wherein at a feed point of the petroleum pipeline and the molten sulphur pipeline a branch line is arranged for a portion of the transported quantity of petroleum and that the heating mantle is again connected flow-wise with the petroleum conduit at a destination point of the route.

10. Transport apparatus according to claim 8 wherein, when combustion engines are used as pump drives for the petroleum and/or the heating medium, the exhaust gas energy of said combustion engines is fed to a heating medium heat exchanger or the heating medium heat exchanger.

11. Transport apparatus according to claim 10 wherein
    a) a control valve is provided in a pump line in which a feed pump for the petroleum conduit is arranged,
    b) the heating mantle is connected with the intake side of the feed pump via a conduit for the heating medium of a preceding conduit section of the sulphur,
    c) the pump conduit of the petroleum conduit is connected with the heating mantle of a subsequent conduit section via a branch line and a heat exchanger,
    d) in the branch line a heating medium flow meter is provided by which the diverted amount can be regulated by means of control valve in the petroleum pump conduit.

12. Transport apparatus according to claim 10 wherein the heat exchanger for the heating medium is connected at its primary side to at least one of the following heat sources:
    a) combustion engine of the petroleum feed pump,
    b) combustion engine of the heating medium feed pump,
    c) petroleum combustion chamber.

13. Transport apparatus according to claim 8, wherein two sections of the heating mantle are connected by a second feed pump and a heat exchanger.

14. Transport apparatus according to claim 8 wherein the sulphur pipe conduit is mounted on the petroleum pipe conduit.

* * * * *